April 30, 1968

J. R. YOUNKIN 3,381,249

AIRCRAFT SWITCHING CONSOLE WITH MAGNETIC DETENT

Filed April 1, 1966

INVENTOR
JAMES R. YOUNKIN

Richards Harris & Hubbard

ATTORNEY

INVENTOR
JAMES R. YOUNKIN

ATTORNEY

United States Patent Office 3,381,249
Patented Apr. 30, 1968

3,381,249
AIRCRAFT SWITCHING CONSOLE WITH MAGNETIC DETENT
James R. Younkin, Mineral Wells, Tex., assignor, by mesne assignments, to Thurman & Younkin, Inc., a corporation of Texas
Filed Apr. 1, 1966, Ser. No. 539,500
10 Claims. (Cl. 335—120)

ABSTRACT OF THE DISCLOSURE

An aircraft switching console has magnetizable actuator arms mounted with spring bias side-by-side on a common axis to control a roll gyro selector, an altitude hold unit and a pitch gyro, respectively. An electromagnet produces a magnetic field to retain any or all of the arms in an actuated position and oppose the spring biasing until returned to the off position by manual pressure. The electromagnet is energized when the roll gyro arm is actuated. The heading selector arm overlaps and is adjacent to the pitch gyro arm actuator. The altitude hold arm overlaps and is adjacent to the pitch gyro arm.

---

This invention relates to a switching console for an aircraft control system, and more particularly to a selectively holding and interlocking switching system with an electromagnetic detent.

The extensive development of aircraft instrumentation has taxed the space available on aircraft instrument panels. Each addition to a control system is accompanied by the possibility of introducing an unsafe element in the operation of the aircraft even though it is intended to add to the safety of aircraft operation. Thus the design and structure of such controls not only must be such that it will provide the positive mechanical function intended but must also be executed with due consideration to human engineering and pilot response under stress. The present invention is directed primarily to a switching console designed for simplified control of a plurality of elements of an aircraft guidance system. In an embodiment above referred to, a roll gyro, a heading selector, an altitude hold unit and a pitch gyro may be independently controlled or two or more of the units may be simultaneously actuated.

The system is compatible to control other aircraft instrumentation components. It provides positive control compatible with reaction of the operator with suitable interlocks compatible with aircraft instrumentation logic.

In accordance with the invention, a switch console is provided with a bank of magnetizable actuator arms mounted side-by-side for independent rotation on a common axis. A magnetizable structure has spaced extremities one of which confronts the arms at a point closer to the axis than the other of the extremities. Means are provided for selectively establishing a magnetic field with opposite magnetic poles at the extremities upon actuation of at least one of the arms. A plurality of switch means are individually mounted to face the actuator arms for actuation thereof upon contact with a given arm. A spring normally biases the arms away from the flanges. In a preferred embodiment, selected pairs of the arms are interlocked for individual actuation of both arms of a pair or for simultaneous actuation of the pair by one of the arms but not by the other.

Figure 1:
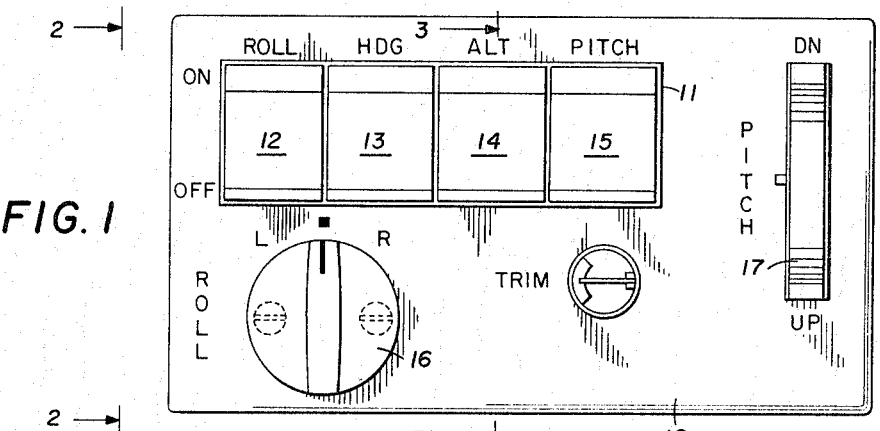
Figure 2:
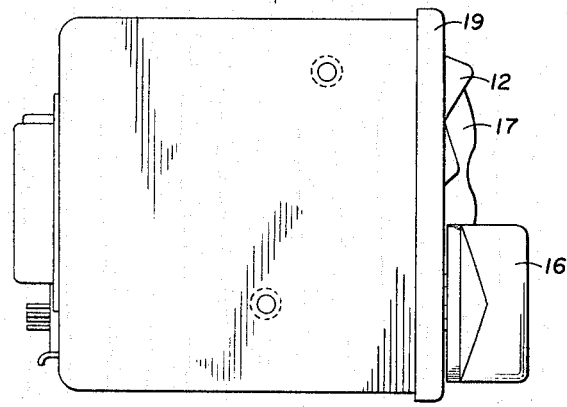
Figure 9:
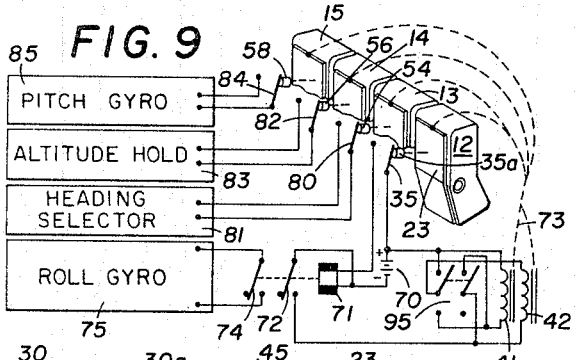
Figure 3:
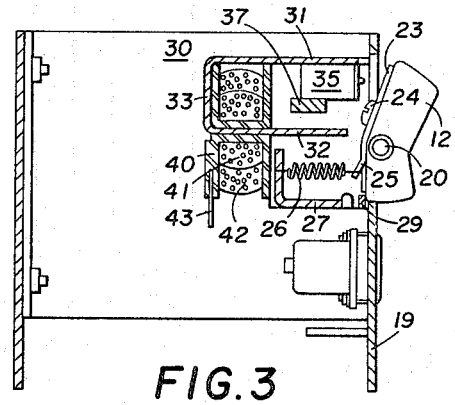
Figure 4:
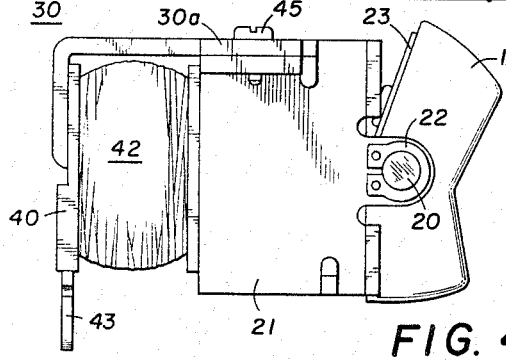
Figure 6:
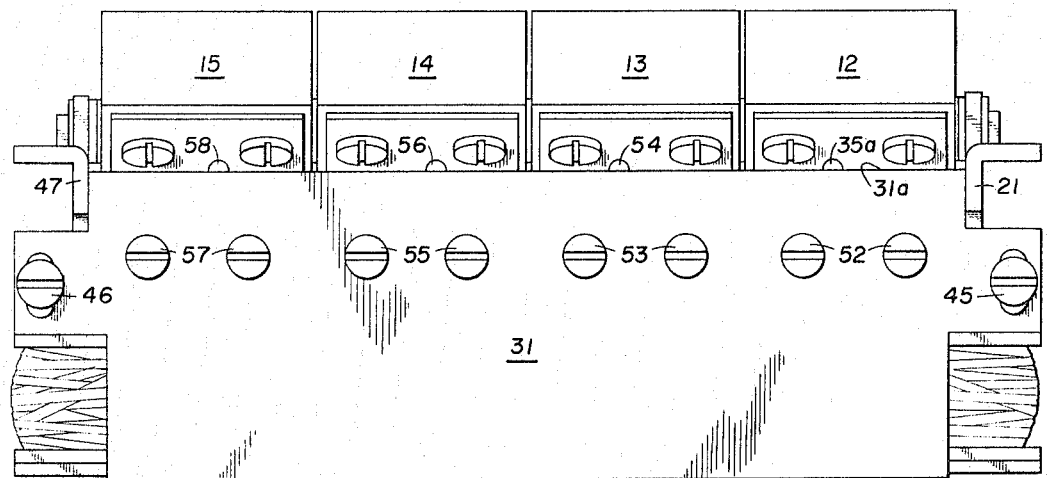
Figure 7:
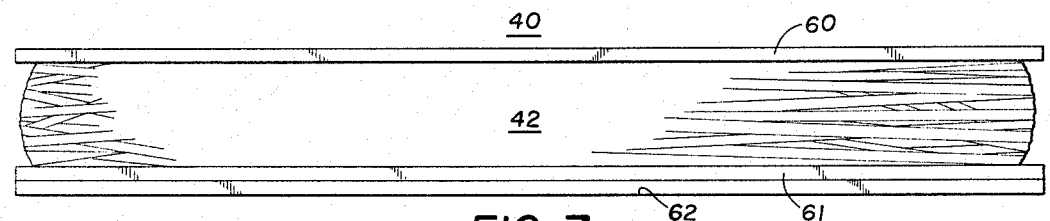
Figure 8:
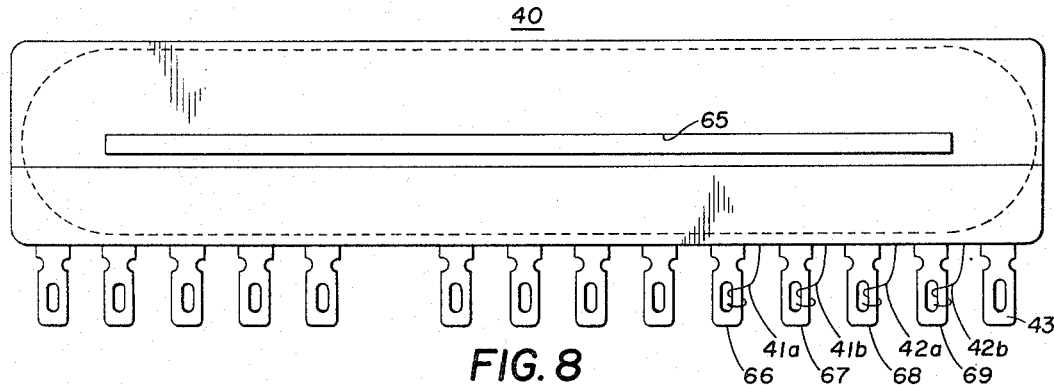
Figure 5:
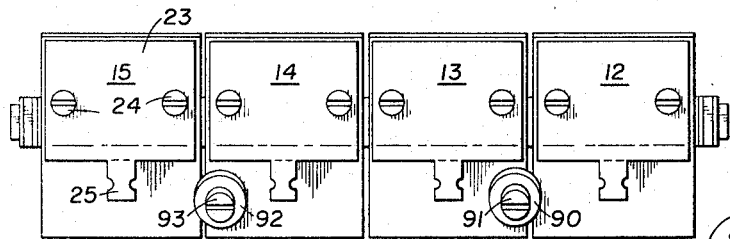

For a more complete understanding of the present invention and for further objects and advantages thereof, reference may now be had to the following description taken in conjunction with the accompanying drawings in which:

FIGURE 1 is a view of the face of the switch console embodying the present invention;

FIGURE 2 is a side view of the unit taken along lines 2—2 of FIGURE 1;
FIGURE 3 is an enlarged sectional view taken along lines 3—3 of FIGURE 1;
FIGURE 4 is further enlarged and is an end view of the switch chassis;
FIGURE 5 is a rear view of four actuator arms;
FIGURE 6 is a top view of the unit of FIGURE 4;
FIGURE 7 is a top view of the spool and coil of FIGURES 3 and 4;
FIGURE 8 is a rear view of the spool of FIGURE 7; and
FIGURE 9 is a circuit diagram showing the relationship of the switch actuators in the aircraft control system.

In FIGURE 1, a control console 10 has been shown as including a bank of switch actuators 11, including specifically four actuators 12, 13, 14, and 15. The actuator 12 controls an ON-OFF switch in a roll axis gyro system. The actuator 13 actuates a control switch in a heading selector circuit of an aircraft. Actuator 14 actuates an altitude hold unit. The actuator 15 controls a pitch axis gyro. The console also includes a roll axis command knob 16 and a pitch axis control element 17.

As viewed from the side in FIGURE 2, the switch actuators 12–15 have dished faces and protrude at top and bottom from the face plate 19 of the control console. Similarly, the roll control knob 16 and the pitch axis control element 17 protrude from the face of the control unit all for convenient access.

The present invention is particularly directed to a unique system involving the bank of switch actuators and associated elements. The actuators 12–15 are mounted in relation to a bank of microswitches such that they may be readily and positively engaged to establish and to hold a given set of switch positions. More particularly, as shown in FIGURE 3, switch actuators 12–15 are mounted for rotation on a shaft 20. The shaft 20, as best shown in FIGURE 4, is supported by an end plate 21 on a switch-mount framework and is secured in place by a snap ring 22.

As shown in FIGURES 3 and 5, the actuator 12 has a flat iron plate 23 mounted on the rear face thereof as by screws 24. The lower end of the plate has an extension 25 to which a spring 26 is attached. The spring is secured at the opposite end to the upturned portion of a plate 27. Thus, the spring 26 tends to rotate the actuator 12 clockwise and normally maintains the top of the plate 23 spaced from the face plate 19. The lower end of the actuator 12 engages a stop 29 to limit clockwise movement.

An elongated U-shaped channel 30 is mounted in the unit with flanges 31 and 32 extending toward the face plate 19. The face plate 19 and the web 33 of the channel 30 are parallel to each other. The flanges 31 and 32 extend substantially perpendicular to the face plate 19. Four microswitches, such as the switch 35, are mounted within the channel 30 and adjacent to the upper flange 31 above a bar 37. The channel 30 is of magnetizable material.

A spool 40 of non-magnetizable material encircles the flange 32 of the channel 30 and supports a pair of coils 41 and 42. The ends of the coils 41 and 42 are connected to terminal connectors, such as connector 43. When a suitable voltage is applied to the coils 41 and 42, a magnetic field is produced in the U-shaped channel 30 with opposite poles located at the extremities of the flanges 31 and 32. When the actuator 12 is rotated counterclockwise, as by manually pressing on the upper portion thereof, the magnetic field will act upon the plate 23 to hold the actuator 12 in contact with the button on the switch 35, and overcomes the opposing force of the spring 26.

So long as the magnetic field exists, the actuator 12 will be held in position to energize the switch 35. The magnetic field is such that the force of the spring 26 will positively be overcome and the actuator will be retained. However, it also is of such magnitude that the switch may be readily rotated clockwise by manually pressing on the lower portion of the actuator.

As seen in FIGURE 4, the end plate 21 is secured to an extension 30a of the channel 30, by a screw 45. A similar plate at the opposite end of the channel 30 is also mounted in the same manner to support the opposite end of the shaft 20.

As shown in FIGURE 6, screw 46 on the opposite end of the channel 30 provides support for the end plate 47. Screws 52 support the switch 35 which is under the control of the actuator 12 with the button 35a extending beyond the edge 31a of the upper flange 31. Screws 53 secure a microswitch which includes the button 54. Screws 55 secure a microswitch which includes the button 56 and the screws 57 mount a microswitch which includes the button 58.

FIGURE 7 illustrates, from the top, the spool on which the coils are mounted. The spool ends 60 and 61 bound a recess in which the coils 41 and 42 are wound. The lower portion 62 of the rear flange 61 is of increased thickness to provide a suitable body in which terminal posts may be cast.

As shown in FIGURE 8, the spool 40 has an elongated central slot 65 through which passes the lower flange 32 of FIGURE 3. Thus, the spool is an elongated relatively short spool designed to fit within the channel 30 and to encompass one of the flanges so that a magnetic field may readily be established therein.

As best shown in FIGURE 8, the coil 41 has extremities 41a and 41b secured to terminal posts 66 and 67, respectively. The coil 42 has extremities 42a and 42b secured to the terminal posts 68 and 69, respectively.

As shown in FIGURE 9, the actuator 12 is so mounted as to control the switch 35a. Switch 35a is a single-pole microswitch having one terminal connected by way of a battery 70 to a solenoid coil 71, the other terminal of which is connected to the second terminal of the switch 35. The relay coil 71 controls a double-pole, double-throw switch. The switch 72, when closed, serves to connect the coils 41 and 42 to the battery 70 so that the magnetic field is established for holding positions of the actuators 12–15. As indicated by the dotted line 73, the coils 41 and 42 are thus coupled to the magnetic plates on the back of the actuators, such as the plate 23 on actuator 12. The second switch 74 is coupled to the roll axis gyro 75.

Similarly, force applied by actuator 13 to the button 54 closes a switch 80 which energizes a heading selector 81. Force applied by the switch actuator 14 to the button 56 closes a switch 82 which energizes an altitude hold unit 83. Force applied to the switch actuator 15 by button 58 closes a switch 84 which energizes a pitch axis gyro 85.

As shown in FIGURE 5, the actuator 12 is next adjacent to the heading selector actuator 13. The actuator 13 has a disk 90 mounted near the lower right-hand side thereof by a screw 91. The edge of the disk 90 extends behind the lower end of the actuator 12. Similarly, a disk 92 is mounted by a screw 93 near the lower left-hand corner of the switch actuator 14. The disk 92 overlaps the rear edge of the actuator 15. By this interlocking structure, the roll actuator 12, as shown in FIGURE 1, may be depressed to energize the holding coils 41 and 42 and the roll axis gyro. Thus, this portion of the aircraft control system may thus be operated independently of any other portion. The heading selector may be added to the system merely by depressing the actuator 13. However, if it is desired to simultaneously initiate actuation of the heading selector and the roll axis gyro, depression of the heading selector actuator alone will rotate both the actuators 12 and 13, thus energizing the coils 41 and 42 to maintain both of the associated switches in closed condition. Similarly, the pitch axis gyro may be actuated independently of the altitude hold unit, but it can be maintained in service only when the roll axis gyro is in operation, i.e., when actuator 12 is depressed to close switch 35. Thus, the roll axis gyro, the heading selector, and the pitch axis gyro can be operated without the altitude hold unit. However, if the altitude hold unit is to be employed, operation of the actuator 14 requires the pitch axis gyro to be energized by reason of the disk 92.

As best shown in FIGURE 9, the coils 41 and 42 are connected so that they can be operated in series or in parallel by use of a switch 95. This means that the coils 41 and 42 may accommodate different source voltages on the battery 70, for example, 12-volt and 24-volt operation, in which the case the coils would be connected in parallel and in series, respectively.

The elements 75, 81, 83 and 85 of FIGURE 9 have been shown in block form. The roll gyro 75, the heading selector 81, the altitude hold unit 83 and the pitch gyro 85 may be of the type manufactured and sold by Mitchell Industries, Inc. of Mineral Wells, Tex., in the Mitchell President Automatic Flight System.

It will be appreciated that the magnetic field produced to overcome the restoring force of the spring is most conveniently established by employing the elongated magnetic channel 30. However, it will also be recognized that a plurality of U-shaped cores could be mounted as to be encompassed by a single energizing coil structure to produce separate magnetic fields to hold the actuator arms. Thus the single magnetizable channel may be substituted by individual elements. However, it will be recognized that in general an integral channel 30 would be more desirable than separate magnetic elements.

Reference has been made to magnetizable arms 12–15. In the system illustrated, portions of the arms were of plastic non-magnetizable material with iron plates on the rear faces. It will be appreciated that each entire arm may be of magnetizable material rather than only a part, as shown. Thus for the purpose of this description, a magnetizable arm is one magnetizable in whole or in part.

Having described the invention in connection with certain specific embodiments thereof, it is to be understood that modifications may now suggest themselves to those skilled in the art and it is intended to cover such modifications as fall within the scope of the appended claims.

What is claimed is:

1. In an aircraft switch console, the combination which comprises:
   (a) a plurality of magnetizable actuator arms mounted side-by-side for rotation about one axis,
   (b) magnetizable means having extremities facing the backs of each of said arms with one of said extremities located closer to said axis than the other of said extremities,
   (c) an elongated coil encompassing said magnetizable means to establish, when energized, magnetic forces having opposite poles at said extremities,
   (d) a plurality of switch means individually mounted to face each of said arms and adapted to be actuated upon movement of a given arm toward said magnetizable means,
   (e) resilient means normally biasing said arms away from said magnetizable means, and
   (f) means responsive to movement of at least one of said arms toward said magnetizable means for energizing said coil to establish and maintain said magnetic field to exceed the force of said resilient means and to provide a holding force on any additional arm moved toward said magnetizable means.

2. The combination defined in claim 1 in which said magnetizable means is an elongated channel having flanges facing the rear of said arms.

3. The combination defined in claim 1 in which said switch means are mounted between said extremities.

4. The combination defined in claim 2 in which one of said flanges is adjacent to said axis and the other is spaced from said axis.

5. The combination defined in claim 4 in which said other of said flanges is on one side of said axis and on the other side of said axis one of said arms has an extension lying behind a second of said arms.

6. In an aircraft switch console, the combination which comprises:
 (a) an elongated channel structure of magnetizable material having parallel flanges,
 (b) a plurality of magnetizable actuator arms mounted side-by-side for rotation about an axis which extends parallel to said flanges at a location closer to a first of said flanges than to the second of said flanges to permit movement of one end of each arm toward and away from said second of said flanges,
 (c) a coil encompassing said channel for establishing when energized a magnetic field having opposite poles at said flanges,
 (d) a plurality of switches individually mounted on one of said flanges to face each of said actuator arms and adapted to be actuated upon movement of a given arm toward said second of said flanges,
 (e) resilient means normally biasing said arms away from said second of said flanges, and
 (f) means responsive to actuation of one of said switch means for energizing said coil to establish and maintain said magnetic field to hold the position of said one of said actuators and of any other actuator moved adjacent to said second of said flanges.

7. The combination set forth in claim 6 in which said arms have a magnetizable plate secured to the back thereof to span the distance between said flanges.

8. The combination set forth in claim 7 in which a coil spring is secured to each of said plates on the side of said axis opposite said flanges.

9. An aircraft control system which comprises:
 (a) a channel structure of magnetizable material having parallel flanges,
 (b) a pair of magnetizable actuator arms mounted side-by-side for rotation about an axis which extends parallel to said flanges and is located closer to a first of said flanges than to the second of said flanges to permit movement of one end of each arm toward and away from the second of said flanges,
 (c) a coil encompassing said channel to establish when energized a magnetic field having opposite poles at said flanges,
 (d) a first aircraft guidance system having a first control switch mounted to face a first of said arms and adapted to be actuated upon movement of said first of said arms toward said second of said flanges,
 (e) a second aircraft guidance system dependent upon said first guidance system having a second control switch similarly mounted to face the back of the second of said arms,
 (f) resilient means normally biasing said arms away from said second of said flanges,
 (g) means responsive to actuation of said first of said arms to close said first control switch for energizing said coil to establish and maintain said magnetic field and maintain the arm positions and to energize said first guidance system, and
 (h) means selectively locking said second of said arms to said first of said arms on movement of said second of said arms toward said flange to close both control switches to energize both guidance systems.

10. The combination set forth in claim 9 in which said first aircraft guidance system is a roll axis guidance system.

References Cited
UNITED STATES PATENTS

| | | | |
|---|---|---|---|
| 1,682,429 | 8/1928 | Shaver | 335—186 |
| 2,298,068 | 10/1942 | Pierce | 335—192 |

BERNARD A. GILHEANY, *Primary Examiner.*

H. BROOME, *Assistant Examiner.*